(12) United States Patent
Li et al.

(10) Patent No.: US 11,750,778 B2
(45) Date of Patent: Sep. 5, 2023

(54) METHOD FOR ADJUSTING PIXEL VALUES OF BLENDING IMAGE AND PROJECTION SYSTEM THEREOF

(71) Applicant: Coretronic Corporation, Hsin-Chu (TW)

(72) Inventors: Chen-Ming Li, Hsin-Chu (TW); Chien-Chun Peng, Hsin-Chu (TW); Yung-Ling Tseng, Hsin-Chu (TW); Chia-Yen Ou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 90 days.

(21) Appl. No.: 17/491,480

(22) Filed: Sep. 30, 2021

(65) Prior Publication Data

US 2023/0096353 A1 Mar. 30, 2023

(51) Int. Cl.
*G03B 21/14* (2006.01)
*H04N 9/31* (2006.01)
*G03B 37/04* (2021.01)

(52) U.S. Cl.
CPC .......... *H04N 9/3147* (2013.01); *G03B 37/04* (2013.01); *H04N 9/3176* (2013.01); *H04N 9/3185* (2013.01)

(58) Field of Classification Search
CPC .. H04N 9/3147; H04N 9/3179; H04N 9/3185; G03B 37/04; G03B 21/14; G03B 21/147
See application file for complete search history.

(56) References Cited

U.S. PATENT DOCUMENTS

| 2011/0234920 | A1 | 11/2011 | Nelson | |
|---|---|---|---|---|
| 2014/0104582 | A1* | 4/2014 | Mori | H04N 9/3182 353/30 |
| 2018/0139442 | A9 | 5/2018 | Moriya et al. | |

FOREIGN PATENT DOCUMENTS

CN  108076332  5/2018

* cited by examiner

*Primary Examiner* — Ryan D Howard
(74) *Attorney, Agent, or Firm* — JCIPRNET

(57) ABSTRACT

The disclosure provides a method for adjusting pixel values of blending image. The method includes projecting, on a projection surface, a first projection image onto a first projection range and a second projection image onto a second projection range by a first projector and a second projector, and blending the first projection image and the second projection image to generate a blending image; calculating positions of a plurality of boundaries of the first projection range and the second projection range; adjusting a range of an overlapping area between the first projection range and the second projection range; and adjusting image parameters of a non-overlapping area outside the overlapping area, to enable pixel values of the non-overlapping area to be close to pixel values of the overlapping area.

7 Claims, 12 Drawing Sheets

METHOD FOR ADJUSTING PIXEL VALUES OF BLENDING IMAGE AND PROJECTION SYSTEM THEREOF

BACKGROUND OF THE DISCLOSURE

Field of the Disclosure

The disclosure relates to a projection method, and in particular to a method for adjusting pixel values of blending image in black-level and a projection system thereof.

Description of Related Art

At present, when a projector performs projection blending, multiple images projected by multiple projectors are blended together, in the black-level, the pixel values of the image at the overlapping part are much higher than the pixel values of the image at the non-overlapping part.

However, the typically known dark field compensation method adjusts each of rectangular ranges by controlling each projector to output one or more fixed rectangular ranges, such that all rectangular ranges can cover the non-overlapping part of the image projected by the corresponding projector.

FIG. 1 is a schematic diagram illustrating a known projection blending operation. Referring to FIG. 1, for example, it is assumed that the projector 10 and the projector 20 are respectively configured to project the first image IMG1 and the second image IMG02 as a full black image. The full black image means that pixel values of the image are all zero. The pixel values include values of Red (0~255), Green (0~255) and Blue (0~255). The image in black-level means that the pixel values of image are RGB (0, 0, 0). However, in real life, even when the pixel values of image are zero, the displayed image is still slightly bright. Its reason is that the light leaks from a light source of a projector. It should be noted that the pixel values of the image OIMG at the overlapping part between the first projection image IMG1 and the second image IMG02 is higher and result in the colour of the overlapping part different from the colour of the non-overlapping part. Typically, a rectangular area RA1 is set in the first image IMG01 by the projector 10 to cover the image IMG01(1) in the non-overlapping area above the overlapping image OIMG in the first image IMG01, and another rectangular area RA2 is set to cover the image IMG01(2) in the non-overlapping area on the left side of the overlapping image OIMG in the first image IMG01. Next, the projector 10 increases the pixel values (values of R, G and B) of all the pixels of images IMG01(1) and IMG01(2) in the non-overlapping area, so that, in the black-level, the pixel values of the images IMG01(1) and IMG01(2) in the non-overlapping area is similar to or equal to the pixel values of the overlapping image OIMG in the overlapping area. Similarly, the conventional method also uses another projector 20 to set a rectangular area RA3 in the second image IMG02 to cover the image IMG02(1) in the non-overlapping area under the overlapping image OIMG in the second image IMG02, and set another rectangular area RA4 to cover the image IMG02(2) in the non-overlapping area on the right side of the overlapping image OIMG in the second image IMG02. Next, the projector 10 increase the pixel values of all the pixels of the images IMG01(1) and IMG01(2) in the non-overlapping area, such that the pixel values of the images IMG01(1) and IMG01(2) in the non-overlapping area is similar to or equivalent to the pixel values of the image OIMG in the overlapping area. It is means that the color of the images IMG01(1) and IMG01(2) in the non-overlapping area is similar to or equivalent to the color of the image OIMG in the overlapping area.

The conventional method performs the setting of the rectangular area four times to set four rectangles, or performs the setting of pixel values of images in the projectors separately to set the projectors, which leads to excessive adjustment operations and reduces the efficiency of the projection blending operation. Therefore, it has drawn the attention of practitioners of the field to find out how to improve the efficiency of projection blending operation for multiple images projected by multiple projectors.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE DISCLOSURE

The disclosure provides a method for adjusting pixel values of blending image and a projection system thereof. Depending on positions of boundaries of the blending area of projection images projected by projectors and positions of boundaries of the projection ranges of the projectors obtaining a range of overlapping area so as to determine a range of non-overlapping area, thereby adjusting image parameters of the non-overlapping area and obtaining a simple and faster adjusting pixel values of the blending image method.

An embodiment of the disclosure provides a method for adjusting pixel values of blending image. The method is adapted for using a processing device comprising a processing device and a plurality of projectors. In the method, a first projection image is projected onto a first projection range on a projection surface by a first projector and a second projection image is projected onto a second projection range on the projection surface by a second projector.

The first projection image and the second projection image are blended to generate a blending image or seamless image.

The processing device calculates positions of a plurality of boundaries of the first projection range and the second projection range according to positions of a plurality of boundaries of the first projection image and the second projection image.

The processing device adjusts a range of an overlapping area between the first projection range and the second projection range on a basis of the positions of the plurality of boundaries of the first projection range and the second projection range.

The processing device adjusts image parameters of a non-overlapping area outside the overlapping area in the first projection range and the second projection range, to enable the pixel values of the non-overlapping area to be close to the pixel values of the overlapping area.

An embodiment of the disclosure provides a projecting system. The projecting system includes a first projector, a second projector, and a processing device. The processing device is connected to the first projector and the second projector. The processing device is configured to control the first projector to project a first projection image onto a first projection range on a projection surface and control the second projector to project a second projection image onto a second projection range on the projection surface; configured to blend the first projection image and the second projection image to generate a blending image; configured to calculate positions of a plurality of boundaries of the first projection range and the second projection range according to positions of a plurality of boundaries of the first projection image and the second projection image; configured to adjust a range of an overlapping area between the first projection range and the second projection range on a basis of the positions of the plurality of boundaries of the first projection range and the second projection range; and configured to adjust image parameters of a non-overlapping area outside the overlapping area in the first projection range and the second projection range, to enable the pixel values of the non-overlapping area to be close to the pixel values of the overlapping area.

Based on the above, the method for adjusting pixel values of blending image and the projection system thereof provided by the embodiments of the disclosure perform projection blending and adjusting of pixel values on projection images projected by different projectors. The processing device calculates and adjusts positions of boundaries of the projection ranges of the projectors, and accordingly adjusts image parameters of a non-overlapping area of a projection range. As a result, not only that the multiple steps of the pixel values adjusting process in the projection blending operation can be simplified, but also the non-overlapping areas with irregular shapes can be efficiently identified, and the time consumed for the projection blending operation for multiple projection images can be reduced, which in turn increases the overall operation efficiency of the projection system.

In order to make the aforementioned features and advantages of the disclosure more comprehensible, embodiments accompanying figures are described in detail below.

Other objectives, features and advantages of the invention may be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The above and other technical contents, features and effects of the disclosure will be clear from the below detailed description of an embodiment of the disclosure with reference to accompanying drawings. The directional terms mentioned in the embodiments below, like "above", "below", "left", "right", "front", and "back" refer to the directions in the appended drawings. Therefore, the directional terms are only used for illustration instead of limiting the disclosure.

Figure 1:
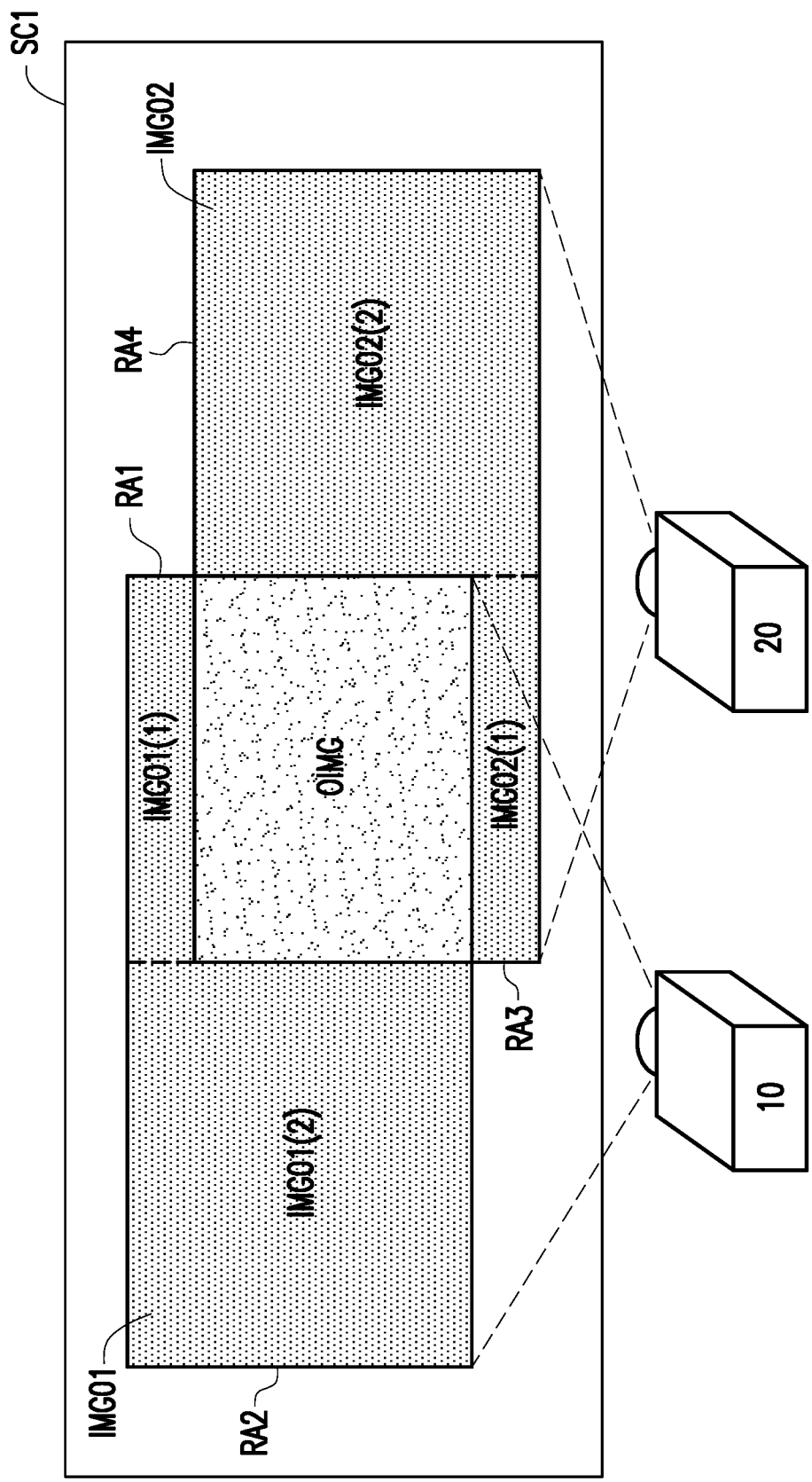
FIG. 1 is a schematic diagram illustrating a known projection blending operation.
Figure 2A:
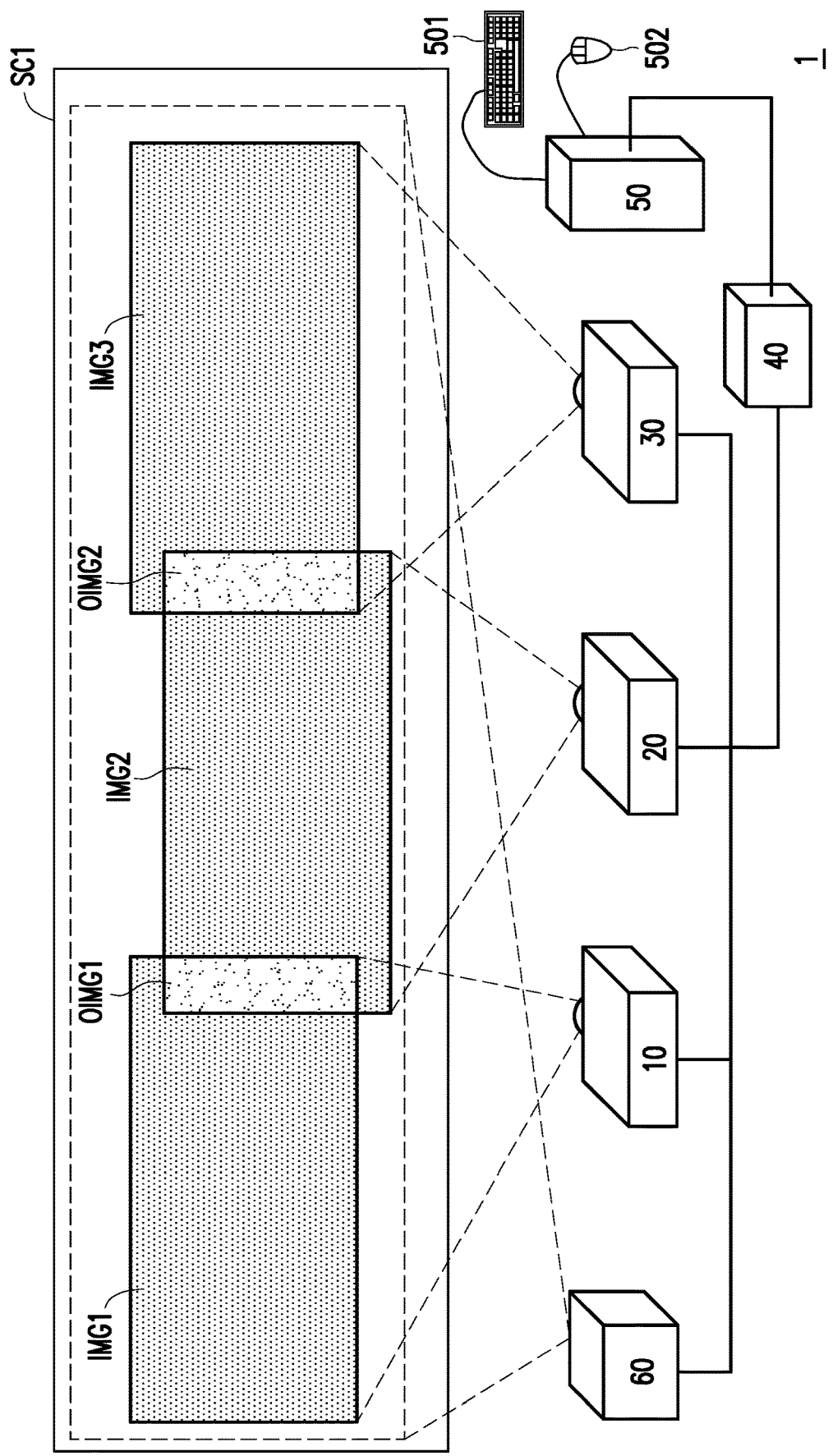
FIG. 2A is a schematic view of a projection system according to an embodiment of the disclosure.

FIG. 2A is a schematic view of a projection system according to an embodiment of the disclosure. Referring to FIG. 2A, the projection system 1 includes a plurality of projectors. In this embodiment, the projection system 1 includes three projectors (e.g., first projector 10, second projector 20, and third projector 30), an image cropping device 40 and a processing device 50. The projection system 1 further includes an image capturing device 60 (camera). The camera 60 is connected with the processing device 50 to provide a captured image included first projection image, second projection image and third projection image on the projection surface. The captured image is used for blending the projection images by operating of the processing device 50.

The user may perform an input operation by an input device (e.g., keyboard 501 and mouse 502) connected with the processing device 50 to trigger the processing device 50 to perform a projection blending operation and a adjusting pixel values operation.

The image cropping device 40 is coupled to the processing device 50. The image cropping device 40 receives the projection instruction and the image data (the data of the image to be projected) provided by the processing device 50, and the image cropping device 40 is configured to respectively transmit the image data corresponding to the projection instruction to the first projector 10, the second projector 20 and the third projector 30 respectively according to the projection instruction provided by the processing device 50. The projection instructions include one or more image cropping instructions. The processing device 50 may transmit a projection instruction to the image cropping device 40, and the image cropping device 40 may capture multiple portions of the image data to become a plurality of sub-image data corresponding to a plurality of sub-images by using a plurality of image cropping instructions in the projection instruction, and the image cropping device 40 transmits the plurality of sub-image data to the plurality of projectors respectively for projection, wherein each projector projects a corresponding image according to the received sub-image data (e.g., first projector 10 projects first projection image IMG1; second projector 20 projects second projection image IMG2; third projector 30 projects third projection image IMG3). It should be noted that two sub-images in multiple sub-images corresponding to two adjacent projectors may have partially identical images/pictures or all have the same image/picture depending on different scenarios.

Since the hardware configuration of the second projector 20 and the third projector 30 may be the same as that of the first projector 10, the hardware components of the first projector 10 are described below with reference to FIG. 2B only.

Figure 2B:
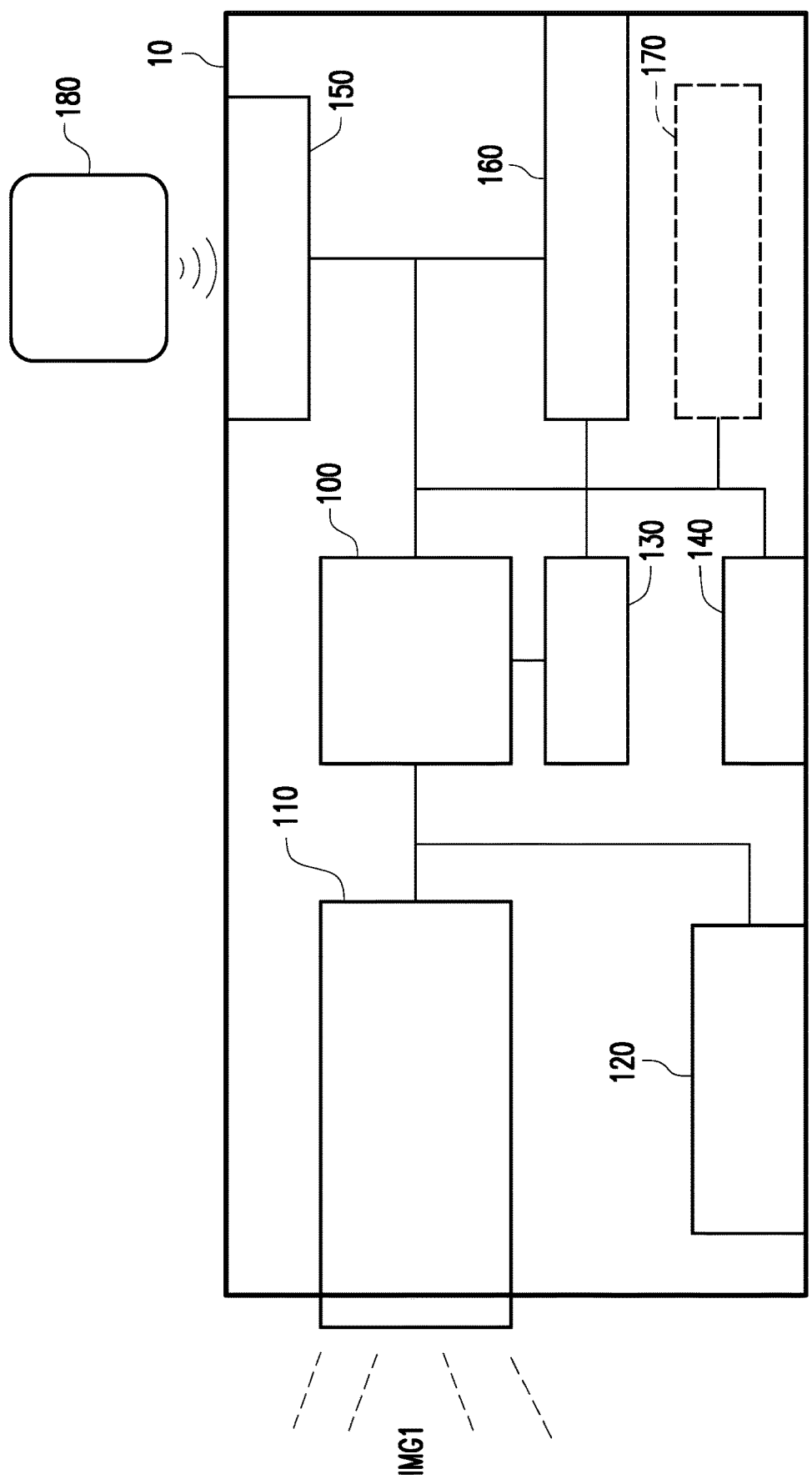
FIG. 2B is a block diagram illustrating a projector according to an embodiment of the disclosure.

FIG. 2B is a block diagram illustrating a projector according to an embodiment of the disclosure. Referring to 2A and 2B, the first projector 10 includes a processor 100 (also referred to as a first processor), a projection module 110 (also referred to as a first projection module), and a power management circuit unit 120 (also referred to as a first power management circuit unit), a storage device 130 (also referred to as a first storage device), a display 140 (also referred to as a first display), an input interface 150 (also referred to as a first input interface), and a connection interface 160 (also referred to as the first connection interface). The processor 100 is coupled to the projection module 110, the power management circuit unit 120, the storage device 130, the display 140, the input interface 150, and the connection interface 160.

In another embodiment, the first projector 10 further includes a communication circuit unit 170 (also referred to as a first communication circuit unit) coupled to the processor 100, and the communication circuit unit 170 is connected to other projectors or internet to access data or instructions in a wired or wireless manner.

In the embodiment, the processor 100 is hardware having computing capabilities or includes an execution program for managing the overall operation of the projector 10. In this embodiment, the processor 100 is, for example, a one-core or multi-core central processing unit (CPU), a programmable micro-processor, a digital signal processor (DSP), a programmable controller, an application specific integrated circuit (ASIC), a programmable logic device (PLD), or the like.

The projection module 110 is configured to receive image data from the processor 100, for example, the first image data provided from an external data terminal (such as processing device 50) to the processor 100 of the projector 10 or the first image data stored in the storage device 130, and transmit the same to the projection module 110. Additionally, regarding the image data of the control pattern provided by the processor 100, the image data of the control pattern may be from the storage device 130 or an external data terminal, and the image beam is projected according to the image data to form a first image corresponding to the image data projected on a projection surface (such as a screen or wall). The projection module 110 includes a light source module and an optical engine. The optical engine includes a light valve and a projection lens. The light source module is used to provide an illumination beam. The light valve is, for example, a reflective or transmissive spatial light modulator, such as a digital micro-mirror device (DMD) or reflective liquid crystal on silicon (LCOS), and the like in the case of reflective spatial light modulator, or such as a transparent liquid crystal panel in the case of transmissive spatial light modulator. In addition, depending on the method of inputting control signal, the spatial light modulator is, for example, an optically addressed spatial light modulator (OASLM) or an electrically addressed spatial light modulator (EASLM), the disclosure provides no limitation to the form and type of the light valve.

In addition, the light valve is disposed on the transmission path of the illumination beam and is used to convert the illumination beam into an image beam. The projection lens is disposed on the transmission path of the image beam and is used to project the image beam out of the projection module 110.

The power management circuit unit 120 is for managing power of the projector 10, and the power management circuit unit 120 is also for receiving power (for example, city power, or other forms of external power) from the outside. The power management circuit unit 120 may also be provided with an independent internal power source, such as a battery.

The storage device 130 is configured to temporarily store data through an instruction of the processor 100, and the data includes data for managing the projector 10, the data received from the external processing device 50 or other type of data, the disclosure is not limited thereto. The above-mentioned data includes, for example, control parameters of various components of the projector or image signals. In addition, the storage device 130 may also record some data that needs to be stored for a long time by the instruction of the processor 100, for example, related information or recorded data corresponding to projection blending, and firmware or software for managing the projector 10. It is worth mentioning that the storage device 130 may be any form of non-volatile memory storage device or volatile memory storage device. For example, the storage device 130 is, for example, a movable random access memory (RAM), a read-only memory (ROM), a flash memory, or the like, or a combination of the above components.

The display 140 is used to display an image or text content of a corresponding operational function of the projector. For example, the display 140 may be a liquid crystal display (LCD), a light-emitting diode (LED) display, or a field emission display (FED). The display 140 is disposed on the housing of the projector 10.

The input interface 150 is configured to receive an input operation applied by the user to the input interface to generate a corresponding control signal. The processor 100 may perform a corresponding function or operation according to the input signal. The input interface 150 may include a plurality of buttons (keys), switches, or knobs corresponding to different functions and is disposed on the housing of the projector 10. The input interface 150 may also be connected to other external input devices (e.g., keyboard, mouse, etc.). In another embodiment, the input interface 150 also has an infrared receiver to receive infrared (also referred to as remote input operation) from the remote control 180, thereby generating corresponding control signals to the processor 100 to perform the corresponding functions. It should be noted that the disclosure is not limited to the specific forms of the various input operations disclosed in the following embodiments. The plurality of input operations may be implemented by pressing a button, using a touch screen, clicking a mouse, using a keyboard, or the like, or a combination thereof.

In an embodiment, the display 140 may also be integrated with the input interface 150 as a touch screen composed of, for example, a resistive, capacitive or optical touch panel to provide display and touch input functions simultaneously.

Referring to FIG. 2A and FIG. 2B, the connection interface 160 is used to be connected to a data terminal (processing device 50) to receive image data from the data terminal. The data terminal is, for example, any electronic device capable of outputting image data. The processing device 50 is, for example, a personal computer, a notebook computer, a server host external storage device, a smart phone, a tablet PC, and the like. The connection interface 160 is a circuit interface that includes a plurality of input interfaces. The input interface is, for example, an input interface conforming to a Video Graphics Array (VGA) standard, a Digital Visual Interface (DVI) standard, a High Definition Multimedia Interface (HDMI) standard, or other suitable standards (for example, DisplayPort standard, 3G-SDI, HDBaseT). However, the disclosure is not limited thereto. For example, in another embodiment, the connection interface 160 may also include being compatible with Serial Advanced Technology Attachment (SATA) standard. However, it should be indicated that the disclosure is not limited thereto, and the connection interface 160 may also be an interface circuit unit conforming to Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) standard or other suitable standards. The first projector 10 may establish connection with the image cropping device 40 through the connection interface 160.

The communication circuit unit 170 may have a wireless communication module (not shown) and support one of Wireless Fidelity (WiFi) system and Bluetooth communication technology or a combination thereof, and is not limited thereto. In addition, the communication circuit unit 170 may further include a network interface card (NIC) connected to the network through the connected network cable. In other words, the communication circuit unit 170 may be connected to the local area network or the Internet in a wired or wireless manner to access data or instructions. The projector 10 may establish connection with the image cropping device 40 through the communication circuit unit 170.

It should be noted that the descriptions regarding the function of the various components of the projector 10 are merely illustrative and are not intended to limit the disclosure. Further, as described above, the projectors 20 and 30 have the same structure as the projector 10. For example, the projector 20 (also referred to as a second projector) includes a second processor, a second projection module, a second power management circuit unit, a second storage device, a second display, a second input interface, and a second connection interface. The projector 30 (also referred to as third projector) includes a third processor, a third projection module, a third power management circuit unit, a third storage device, a third display, a third input interface, and a third connection interface. Additionally, in another embodiment, the projectors 20 and 30 further include a second communication circuit unit and a third communication circuit unit coupled to the second processor and the third processor. The details of the hardware of the second projector 20 and the third projector 30 are omitted.

In this embodiment, referring to FIG. 2A, the image cropping device 40 is, for example, a device that inputs image data and has a cropping image function through a projection instruction. The image cropping device is, for example, a graphics card or an Optoma GB-200 projection blending device, and the disclosure is not limited to the above device. In addition, the image cropping device 40 is also used to perform image processing operation for projection blending.

Figure 2C:
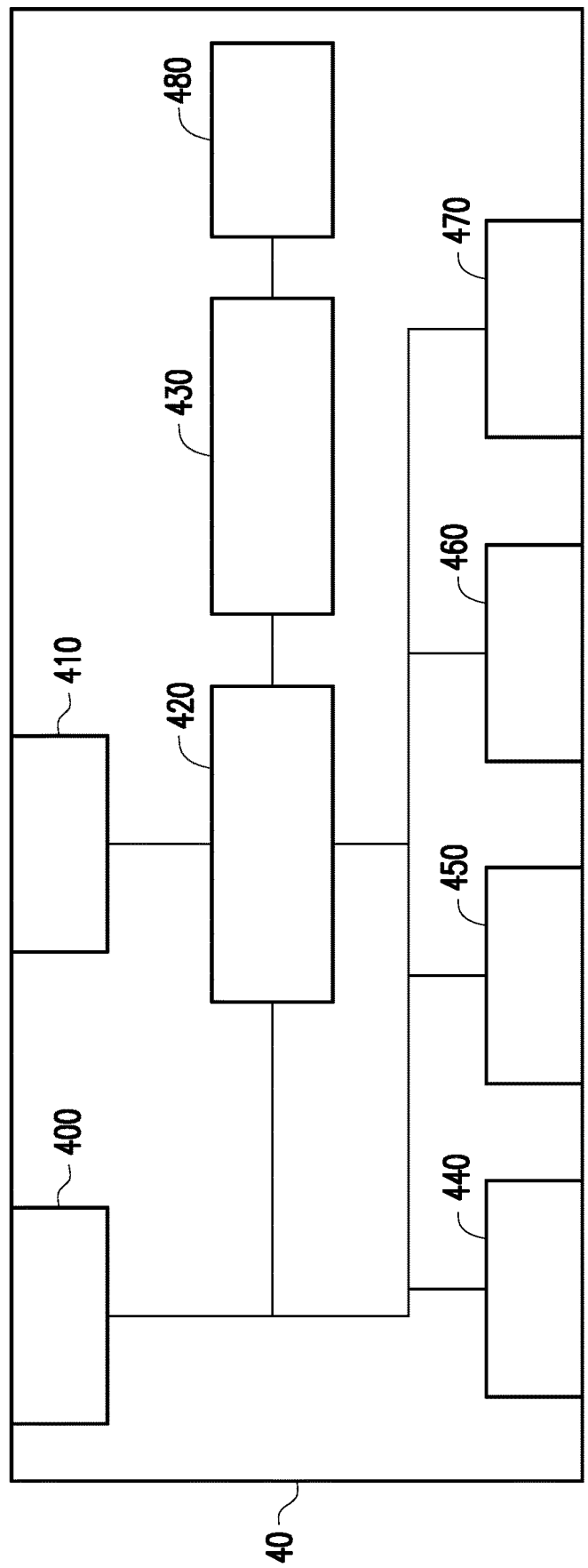
FIG. 2C is a block diagram illustrating an image cropping device according to an embodiment of the disclosure.

FIG. 2C is a block diagram illustrating an image cropping device according to an embodiment of the disclosure. Referring to FIG. 2C, the image cropping device 40 includes a power management unit 400, a connection interface 410, an image cropping processor 420, an image segmentation management module 430, a first output interface 440, a second output interface 450, a third output interface 460, a fourth output interface 470, a connection interface 480 and a storage device 480. The image cropping processor 420 is coupled to the connection interface 410, the power management unit 400, the image segmentation management module 430, the first output interface 440, the second output interface 450, the third output interface 460, the fourth output interface 470, and the storage device 480.

The image cropping processor 420 is hardware capable of processing images for processing image data inputted by the processing device 50. In this embodiment, the image cropping processor 420 is, for example, a one-core or multi-core central processing unit (CPU), a graphics processing unit (GPU), a programmable micro-processor, a digital signal processor (DSP), a programmable controller, an application specific integrated circuits (ASIC), a programmable logic device (PLD) or other similar devices. In addition, the image segmentation management module 430 controls the cropping settings of the pattern to perform corresponding operations (e.g., image segmentation operations, etc.) to implement the projection blending method (or adjusting pixel values method) provided by the embodiments of the disclosure.

The connection interface 410 is connected to the processing device 50, and the connection interface 410 receives the image data and projection instructions transmitted from the processing device 50. The connection interface 410 is a circuit interface of the input interface. The input interface is, for example, an input interface conforming to Video Graphics Array (VGA) standard, Digital Visual Interface (DVI) standard, High Definition Multimedia Interface (HDMI) standard, or other suitable standards (for example, DisplayPort standard, 3G-SDI, HDBaseT). The first output interface 440, the second output interface 450, the third output interface 460, and the fourth output interface 470 are, for example, circuit interfaces of multiple output interfaces. The output interface is, for example, an output interface conforming to Video Graphics Array (VGA) standard, Digital Visual Interface (DVI) standard, High Definition Multimedia Interface (HDMI) standard, or other suitable standards (for example, DisplayPort standard, 3G-SDI, HDBaseT). The disclosure provides no limitation to the specifications of the above input or output interface. In addition, the storage device 480 is, for example, a movable random access memory (RAM), a read-only memory (ROM), a flash memory, or the like, or a combination of the above elements.

In FIG. 2A, in this embodiment, the processing device 50 is, for example, any electronic device (also referred to as a data terminal) that can output image data, such as a personal computer, a notebook computer, a server host external storage device, a smart phone, a tablet PC, and so on. In addition, the processing device 50 is further configured to perform a projection blending operation and a adjusting pixel values method. The so-called adjusting pixel values method is to adjust the pixel values of Red, Green and Blue of image. Due to the user operating the OSD interface of the projector, the pixel values of Red, Green and Blue of image can be adjusted, so as to make the user visually perceives that the blended image approximately appears in a consistent chroma.

Figure 3:
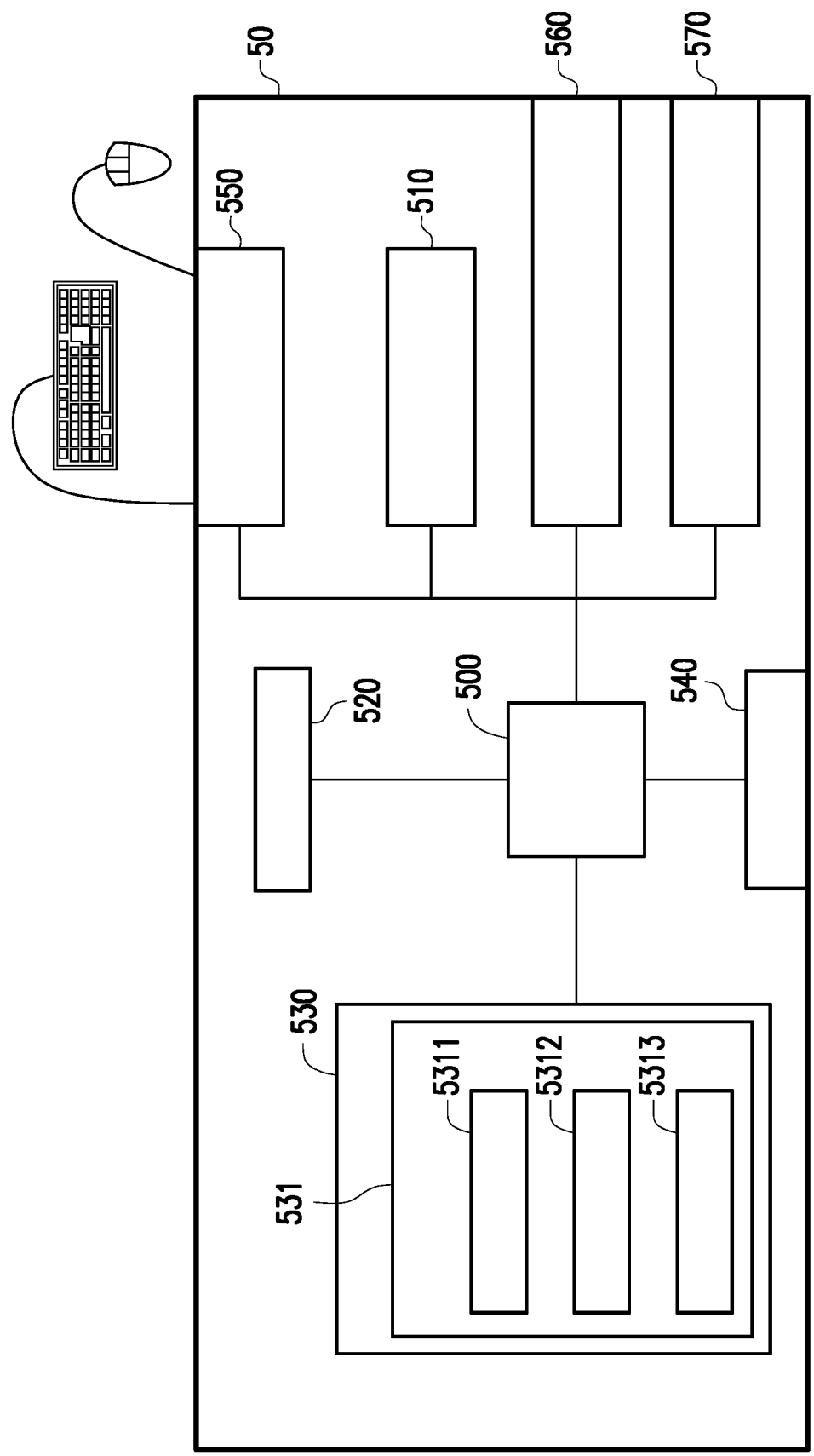
FIG. 3 is a block diagram illustrating a processing device according to an embodiment of the disclosure.

FIG. 3 is a block diagram illustrating a processing device according to an embodiment of the disclosure. Referring to FIG. 3, the processing device 50 includes a main processor 500, a main memory 510, a power management circuit unit 520, a storage device 530, a display 540, an input interface 550, a connection interface 560, and a communication circuit unit 570. The main processor 500 is coupled to the main memory 510, the power management circuit unit 520, the storage device 530, the display 540, the input interface 550, the connection interface 560, and the communication circuit unit 570.

The functions of the power management circuit unit 520, the display 540, the input interface 550, the connection interface 560, and the communication circuit unit 570 are similar to the power management circuit unit 120, the display 140, the input interface 150, the connection interface 160, and the communication circuit unit 170, and thus related descriptions are omitted herein.

The storage device 130 is configured to record some data that needs to be stored for a long time, for example, related information or recorded data corresponding to projection blending, multiple image data, and firmware or software for managing the projector 10. It should be noted that the storage device 130 may be a non-volatile memory storage device of any form (e.g., a hard disk drive or a solid state drive). In this embodiment, the storage device 530 is further configured to store a plurality of program codes/application programs, and the main processor 500 may access the program code/application program to perform various operations. The plurality of program codes includes program instruction module 531 (also referred to as a projection blending application program and an adjusting pixel values program). The program instruction module 531 includes an image segmentation management module 5311, a control pattern setting module 5312, and an adjusting pixel values management module 5313.

The main processor 500 is hardware having computing capabilities for managing the overall operation of the processing device 50. In this embodiment, the main processor 500 is, for example, a one-core or multi-core central processing unit (CPU), a programmable micro-processor, a digital signal processor (DSP), a programmable controller, an application specific integrated circuit (ASIC), a programmable logic device (PLD), or the like. The main processor 500 may access and execute the program instruction module 531, the image segmentation management module 5311, the control pattern setting module 5312, and the adjusting pixel values management module 5313 to perform corresponding operations (e.g., image segmentation management operations, projection blending operation, adjusting pixel values program, etc.) to implement the projection blending method (or adjusting pixel values method) provided by the embodiments of the disclosure. The image segmentation management module 5311 is configured to manage the image data transmitted to the image cropping device 40; the control pattern setting module 5312 is configured to set and render a control pattern to the selected projector, and identify overlapping area and non-overlapping area; the adjusting pixel values management module 5313 is configured to adjust the image parameters of image data transmitted to the selected projector.

The main memory 510 is configured to temporarily store data or various instructions for controlling the processing device 50 through an instruction from the main processor 500. The data includes data for managing the processing device 50, configured to transmit image data or projection instructions to the image cropping device 40, and the disclosure is not limited thereto. It should be noted that the main processor 500 may load the program instruction module 531 from the storage device 530 into the main memory 510 to execute the program instruction module 531 by the main memory 510.

It should be indicated that the input interface 550 may be coupled to the keyboard 501 and the mouse 502, so that the user can perform an input operation through the keyboard 501 and the mouse 502, and the main processor 500 may send the corresponding instruction or execute the corresponding program code according to the input operation (e.g., receiving the input signal corresponding to the input operation). In addition, if the processing device 50 is a tablet PC, or a similar electronic device such as a smart phone, the display 540 may be integrated with the input interface 550 as a touch screen; if the processing device 50 is a notebook computer, the input interface 550 may have a keyboard and a touch pad.

It should be noted that, in an embodiment, the image cropping device 40 may be integrated with the processing device 50. For example, the processing device 50 may have a graphics card including an image cropping device 40 and a graphics processing unit (GPU). The graphics processing unit is also known as a graphics core, a visual processor, a display chip, or a graphics chip, which is a microprocessor that specifically performs graphics calculating operation on personal computers, workstations, game consoles, and some mobile devices (such as tablet PC, smart phones, etc.). The graphics card may be coupled to the main processor 500 through the connection interface 560.

The projection blending method and the adjusting pixel values of blending image method provided by the disclosure and the projection system 1 and the processing device 50 (and the function of the program instruction module 531) using the method are described in detail below with reference to a plurality of drawings.

Referring to FIG. 2A, for example, it is assumed that the projection system 1 includes a first projector 10, a second projector 20, and a third projector 30. The first projector 10, the second projector 20, and the third projector 30 are all connected to the image cropping device 40, and the image cropping device 40 is connected to the processing device 50, and the user currently wants to perform projection blending operation (or adjusting pixel values program).

In response to an input operation that triggers a projection blending operation (or adjusting pixel values program) (e.g., a user clicks a button indicating that the projection blending operation is initiated using the mouse 503), the main processor 500 of the processing device 50 may be responsive to the signal generated by the input operation and start to perform the projection blending operation (through executing the program instruction module 531).

Then, the main processor 500 (e.g., by executing the image segmentation management module 5311) transmits the first projection instruction, the second projection instruction, and the third projection instruction to the image cropping device 40, wherein the image cropping device 40 transmits the first image data to the first projector 10 according to the first projection instruction, transmits the second image data to the second projector 20 according to the second projection instruction, and transmits the third image data to the third projector 30 according to the third projection instruction. In FIG. 2A, the first projector 10 projects the first projection image IMG1 onto the projection surface SC1 according to the first image data, the second projector 20 projects the second projection image IMG2 onto the projection surface SC1 according to the second image data, and the third projector 30 projects the third projection image IMG3 onto the projection surface SC1 according to the third image data. In this embodiment, the first projection image IMG1, the second projection image IMG2, and the third projection image IMG3 are independent main images, and the main image is a preset image used for the adjusting pixel values program. More specifically, the first image data is used to indicate that the first image is a pure black image (pixel values of RGB are (0,0,0)); the second image data is used to indicate that the second image is a pure black image; and the third image data is used to indicate that the third image is a pure black image. It should be noted that the disclosure provides no limitation to the type of main image. For example, in an embodiment, the main image (i.e., the first image, the second image, and the third image) may be image of other colors (e.g., a pure gray image, a single primary color image showing one of the three primary colors). In another example, in another embodiment, the boundary of the main image (i.e., the first image, the second image, and the third image) has a pure color frame such as a white frame (the color of the frame is different from the color of the image in the frame), such that the user can clearly identify the boundary of the projected multiple images and the overlapping area.

A first portion of the first projection image IMG1 and a first portion of the second projection image IMG2 projected on the projection surface SC1 overlap to form an overlapping image OIMG1 in the overlapping area (light-colored area at the boundary between the first image and the second image as shown in FIG. 2A) on the projection surface SC1, and in black-level, the chroma of the overlapping image OIMG1 in the overlapping area is different than that of the first projection image IMG1 and the second projection image IMG2 of other parts. In addition, a first portion of the third projection image IMG3 and a second portion of the second projection image IMG2 projected on the projection surface SC1 overlap to form an overlapping image OIMG2 in the overlapping area (the light-colored area at the boundary between the third image and the second image as shown in FIG. 2A) on the projection surface SC1, and in black-level, the pixel values of the overlapping image OIMG2 in the overlapping area is higher than that of the third projection image IMG3 and second projection image IMG2 of other portions. It should be indicated that the projection surface SC1 may be a flat surface (e.g., curtain, wall) of any forms, and the preferred one is a custom-made white projection screen.

After the first projection image IMG1, the second projection image IMG2, and the third projection image IMG3 are all projected onto the projection surface SC1, the user may choose to perform a setting operation of the control pattern and a corresponding projection blending operation and adjusting pixel values program through the processing device 50.

In embodiments of the invention, the adjusting pixel values and projection blending are performed and a result of projection blending may be applied to the compensate of the adjusting pixel values, so as to enhance the efficiency of the even chroma of the blending image. That is, a blending area of two projection images obtained through the projection blending method may be used to derive the boundaries of the projection ranges of projectors. Accordingly, the boundaries may be presented and one or more control points capable of being operated to fine tune the boundaries may be provided on the boundaries so as to facilitate adjustment of pixel values in the blending image. As a range of the overlapping area between the projection ranges is adjusted, image parameters of the non-overlapping area outside the overlapping area in the projection ranges are adjusted so as to balance the pixel values of the overlapping area and the non-overlapping area of the projection ranges.

Figure 4A:
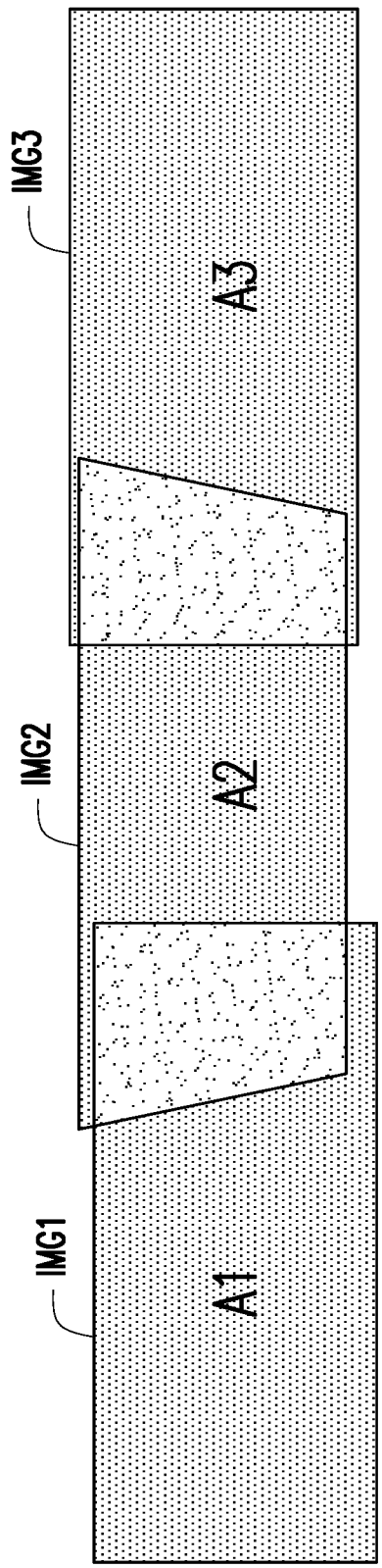
FIG. 4A to FIG. 4F are schematic diagrams illustrating projection blending of the projection images.

FIG. 4A to FIG. 4F are schematic diagrams illustrating projection blending of the projection images. Referring to FIG. 2A and FIG. 4A, projection images IMG1 to IMG3 are respectively projected onto projection ranges A1 to A3 on a projection surface SC1 by three projectors (the first projector 10, the second projector 20 and the third projector 30). Due to the differences on the projection direction or distance between the projectors and the projection surface, the projection ranges A1 to A3 are not aligned to each other, resulting in displacement and deformation of the projection images IMG1 to IMG3. Through performing projection blending on the projection images IMG1 to IMG3 by the processing device 50, a blending image with smooth boundaries may be obtained.

Figure 4B:
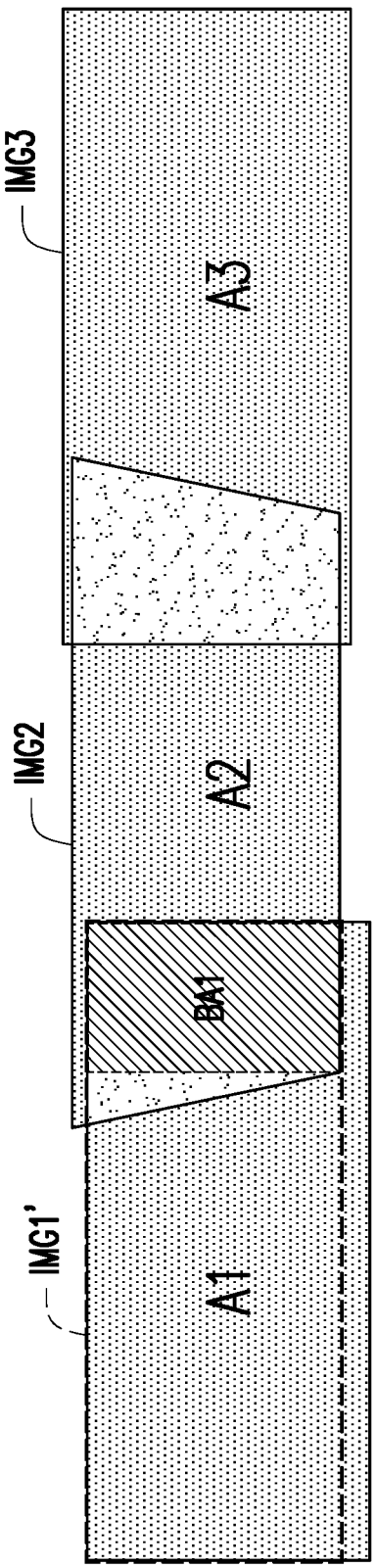

In detail, referring to FIG. 4A and FIG. 4B, the first projection image IMG1 is overlapped with the second projection image IMG2, and therefore projection blending may be performed on the projection images IMG1 and IMG2 to obtain a blending area BA1 while deforming the projection image IMG1 to be a deformed first projection image IMG1'. The overlapping image OIMG1 of FIG. 2A is formed on the blending area BA1.

In some embodiments, the projection blending may be implemented by projecting test patterns in the projections images, physically capturing images of the projection images on the projection surface by a camera, identifying the positions and shapes of the test patterns in the captured images, and accordingly deform the projection images to match the test patterns presented therein. The overlapping area and non-overlapping area of the deformed projection images are calculated and used as a basis to stitch and blend the deformed projection images through a projection blending algorithm by the processing device so as to generate a blending image. The method of projection blending described above (i.e. using a test pattern) is given as an example, but the embodiment is not limited thereto.

Figure 4C:
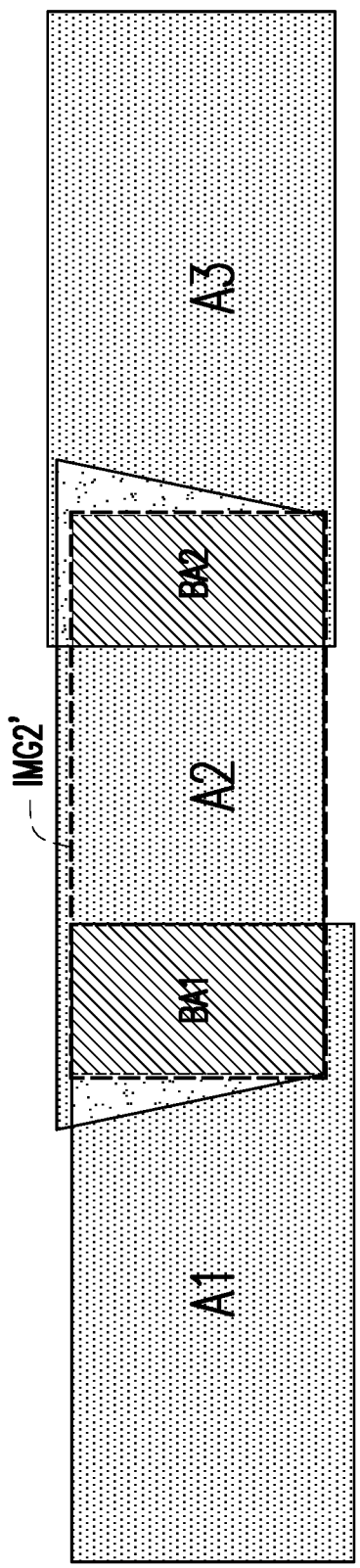

Referring to FIG. 4A and FIG. 4C, the second projection image IMG2 is overlapped with the projection images IMG1 and IMG3, and therefore projection blending is performed on the projection images IMG1, IMG2 and IMG3 to obtain two blending areas BA1 and BA2 while deforming the second projection image IMG2 to be a deformed second projection image IMG2'.

Figure 4D:
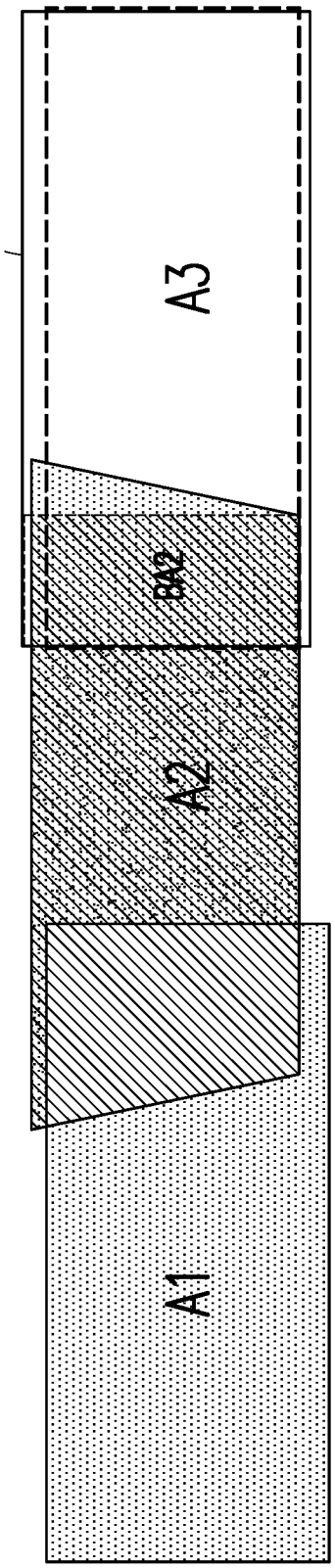

Referring to FIG. 4A and FIG. 4D, the third projection image IMG3 is overlapped with the second projection image IMG2, and therefore projection blending is performed on the projection images IMG2 and IMG3 to obtain a blending area BA2 while deforming the third projection image IMG3 to be a deformed third projection image IMG3'. The overlapping image OIMG2 of FIG. 2A is formed on the blending area BA2.

Figure 4E:
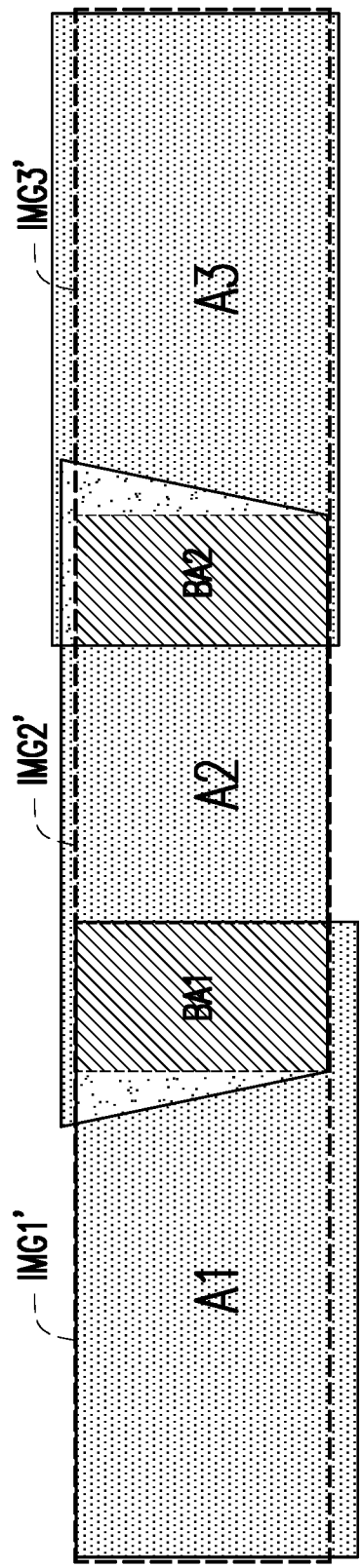
Figure 4F:
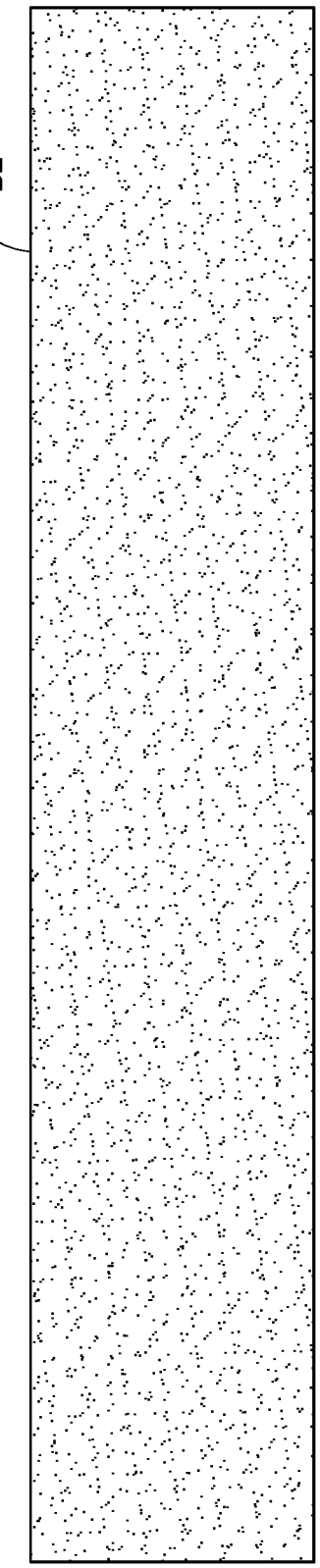

Referring to FIG. 4E and FIG. 4F, the deformed projection images IMG1' to IMG3' as obtained through projection blending described above are deformed, stitched and blended together to form a blending image BL with aligned boundaries as shown in FIG. 4F. As a result, a broad and smooth image can be present by the three projectors.

Different from the projection images that can be deformed by changing data of the projection images in the processing device 50, the positions and shapes of projection ranges of the projectors are fixed due to hardware limitation, resulting in pixel values inconsistence occurred on the overlapping area and non-overlapping area of the projection ranges. However, the pixel values of projection images projected onto those projection ranges can be separately and partially adjusted, so as to compensate the differences of the pixel values between the overlapping area and non-overlapping area of the projection ranges.

The method for adjusting pixel values of blending image is described below. In some embodiments, the positions of the boundaries of the projection ranges are known according to a coordinate relationship between the camera and the projectors. The coordinate relationship is formed by the capturing images from the camera and the images projected by the projectors. Therefore, the processing device 50 achieves the data of the positions of the boundaries of the projection ranges projected by the projectors. In further explanation, due to abovementioned projection blending method, the projectors are implemented to project test pattern into the projection ranges corresponding to the projection images respectively. The camera captures the capturing images of the projection images on the projection surface. The processing device may identify the positions and shapes of the test patterns in the captured images, and accordingly deform the projection images to match the test patterns presented therein. Therefore, the processing device may obtain the positions of the boundaries of the projection ranges projected by projectors.

The positions of the boundaries of the projection ranges can be calculated by the processing device 50 according to a deformed ratio of a deformed area and the boundaries of the blending areas in the blending image and used to derive the overlapping area of the projection ranges.

Figure 5A:
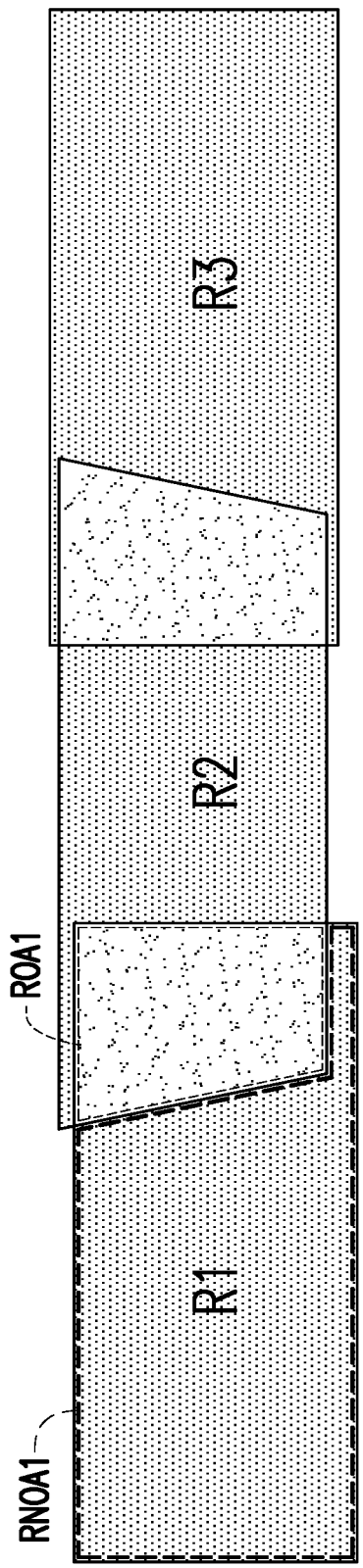
FIG. 5A to FIG. 5C are schematic diagrams illustrating the overlapping area and non-overlapping area between projection ranges.
Figure 5B:
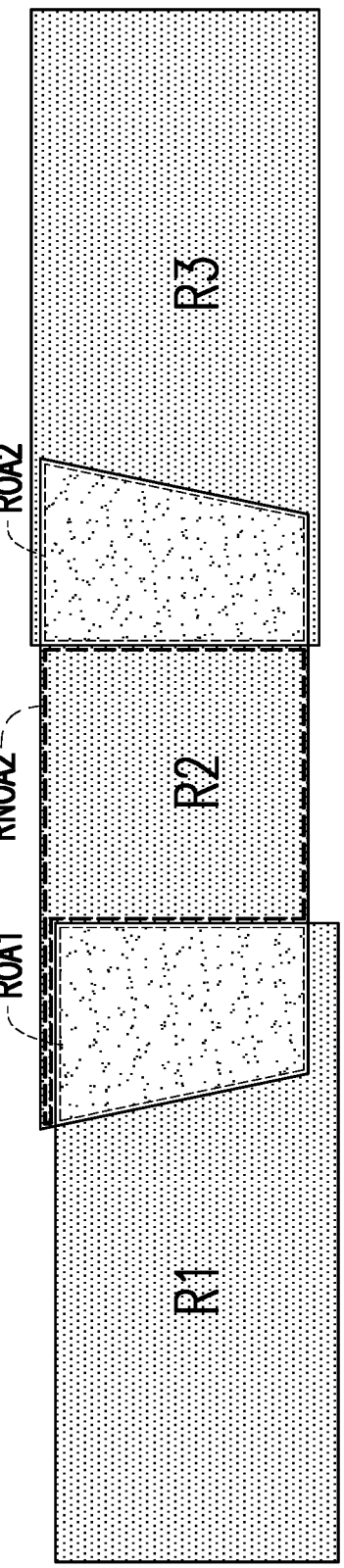
Figure 5C:
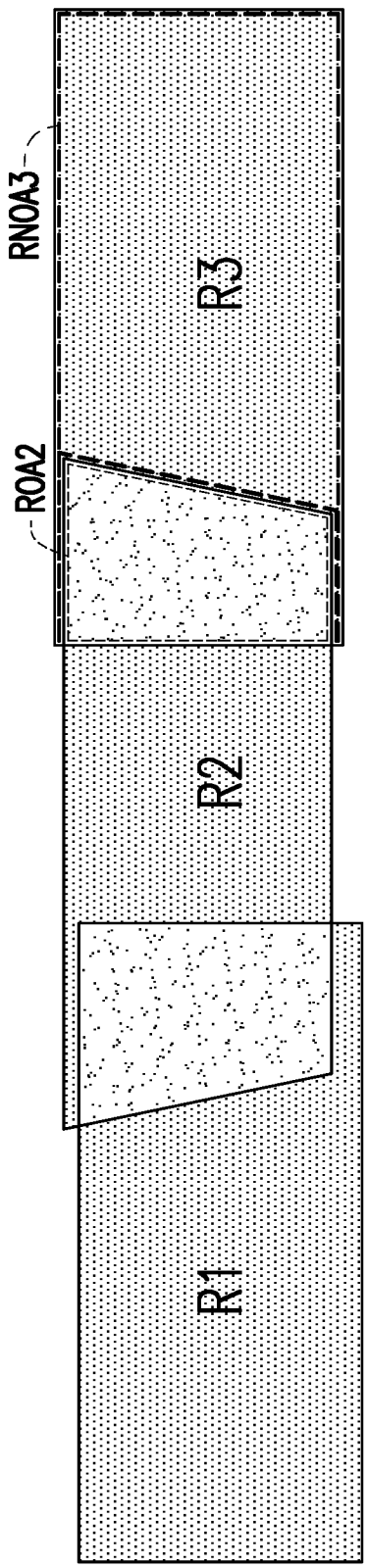
Figure 5D:
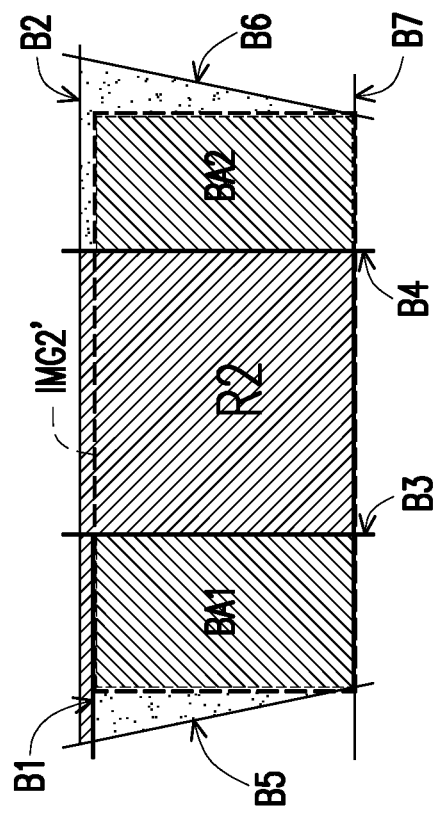
FIG. 5D is a schematic diagram illustrating the boundaries of the projection ranges derived from the deformed area and blending area obtained in projection blending.

For example, FIG. 5A to FIG. 5C are schematic diagrams illustrating the overlapping area and non-overlapping area between projection ranges, and FIG. 5D is a schematic diagram illustrating the boundaries of the projection ranges derived from the deformed area and blending area obtained in projection blending for adjusting the pixel values of the blending image.

Referring to FIG. 5A, the projection range R1 of the first projector 10 has an overlapping area ROA1 with the projection range R2 of a second projector 20 and has a non-overlapping area RNOA1. The positions of boundaries between the overlapping area ROA1 and the non-overlapping area RNOA1 may be derived from the blending area BA1 obtained in the projection blending as illustrated in FIG. 4B and the positions of the boundaries of the projection range R1.

Referring to FIG. 5B, the projection range R2 of the second projector 20 has an overlapping area ROA1 with the projection range R1 of the first projector 10, has an overlapping area ROA2 with the projection range R3 of the third projector 30, and has a non-overlapping area RNOA2 outside the overlapping areas ROA1 and ROA2. The positions of boundaries between the overlapping areas ROA1 and ROA2 and the non-overlapping area RNOA2 may be derived from the blending areas BA1 and BA2 obtained in the projection blending as illustrated in FIG. 4B and FIG. 4C and the positions of the boundaries of the projection range R2.

Referring to FIG. 5C, the projection range R3 of the third projector 30 has the overlapping area ROA2 with the projection range R2 of the second projector 20 and has a non-overlapping area RNOA3. The positions of boundaries between the overlapping area ROA2 and the non-overlapping area RNOA3 may be derived from the blending area BA2 obtained in the projection blending as illustrated in FIG. 4D and the positions of the boundaries of the projection range R3.

Referring to FIG. 5D, FIG. 5D illustrates how the positions of boundaries between the overlapping areas ROA1 and ROA2 and the non-overlapping area RNOA2 in FIG. 5B are derived from the blending area BA1 and BA2 and the positions of the boundaries of the projection range R2.

In detail, the position of the boundary B1 may be derived from an upper boundary of the projection range R1. The position of the boundary B2 may be derived from an upper boundary of the projection range R3. The positions of the boundaries B3 and B4 may be derived from a right boundary of the blending area BA1 of the deformed projection image IMG1' and a left boundary of the blending area BA2 of the deformed projection image IMG3' respectively. The boundaries B5 to B7 are a left boundary, a right boundary and a lower boundary of the boundaries of the projection range R2, respectively.

Based on the positions of the boundaries B1 to B7 derived above, the non-overlapping area RNOA2 (as shown in FIG. 5B) outside the overlapping areas ROA1 and ROA2 in the projection range R2 can be obtained. Therefore, the non-overlapping area RNOA2 defines that an area needs to be adjusted pixel values in the projection range R2. In the same method, the non-overlapping area RNOA1 and the non-overlapping area RNOA3 also can be obtained, such that areas need to be adjusted pixel values in the projection range R1 and R3 also can be obtained.

For example, with respect to the non-overlapping area RNOA2, an adjustment of one or more control points is further provided for a user to fine tune the boundaries through the input device connected with the processing device 50. In some embodiments, one or more control points are provided on the boundaries to facilitate adjustment of the boundaries between the overlapping area and the non-overlapping area.

In some embodiments, one control point may be set on each of the boundaries of the overlapping areas. In response to control of the control point by an input operation of the input device, the position of the control point is adjusted, and the position of the boundary on which the control point is set is correspondingly adjusted, such that the range (boundaries) of the overlapping area is adjusted.

Figure 6A:
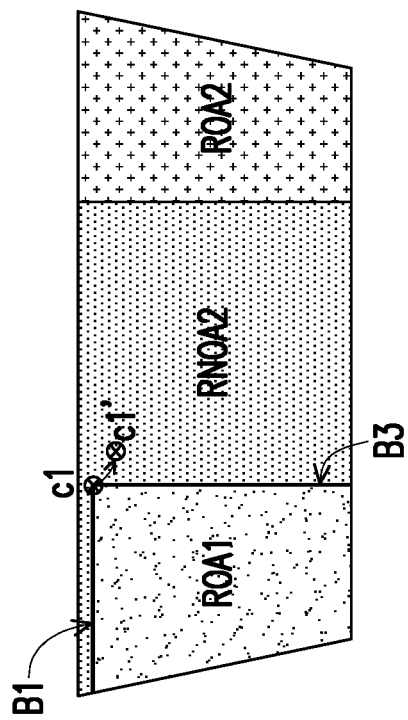
FIG. 6A and FIG. 6B are schematic diagrams illustrating adjustment of boundaries of the overlapping area in the projection range by using one control point.
Figure 6B:
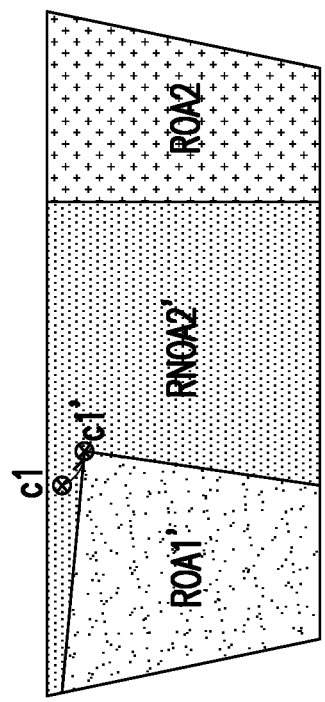

For example, FIG. 6A and FIG. 6B are schematic diagrams illustrating adjustment of boundaries of the overlapping area in the projection range by using one control point. Referring to FIG. 6A, a position of control point c1 is set in a corner of boundaries B1 and B3 of the overlapping area ROA1, and in response to an input operation on the position of the control point c1, the position of the control point c1 is moved to a position of the control point c1', and the positions of the boundaries B1 and B3 on which the position of the control point c1 is set are correspondingly adjusted, such that the range of the overlapping area can be adjusted from ROA1 in FIG. 6A to ROA1' in FIG. 6B, and the range of the non-overlapping area can be adjusted from RNOA2 in FIG. 6A to RNOA2' in FIG. 6B.

In some embodiments, multiple control points are set on each of the boundaries, and the control points may include fixed points whose positions are fixed and adjustable points whose positions can be adjusted. In response to an input operation on one of the adjustable points, the positions of the adjustable points are interlocking adjusted, and the positions of the boundaries on which the control points are set may also be adjusted, such that the range of the overlapping area is adjusted.

Figure 7:
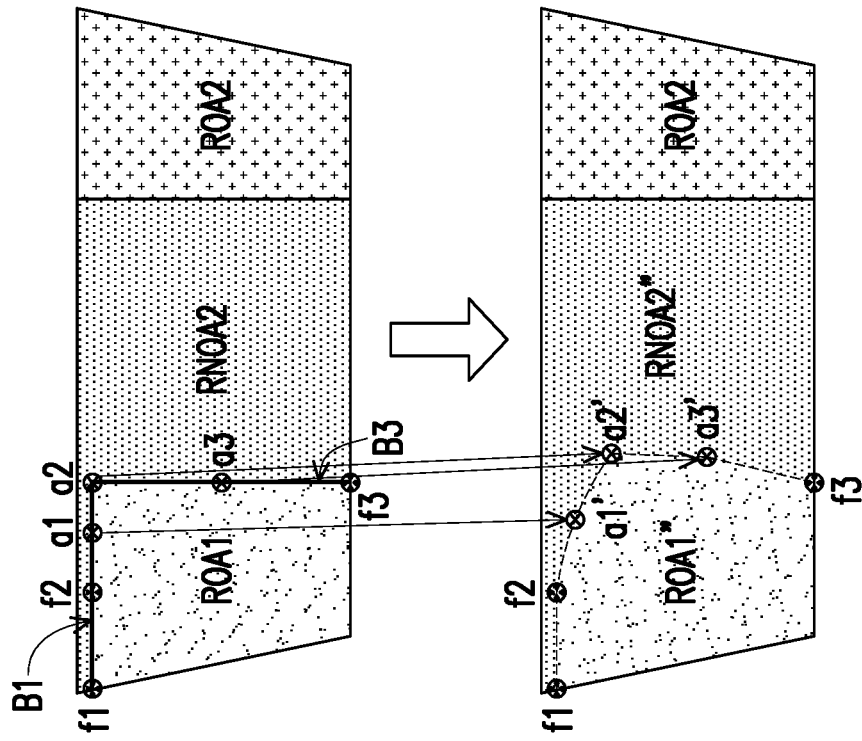
FIG. 7 is schematic diagrams illustrating adjustment of boundaries of the overlapping area in the projection range by using multiple control points.

For example, FIG. 7 is schematic diagrams illustrating adjustment of boundaries of the overlapping area in the projection range by using multiple control points. Referring to FIG. 7, two positions of fixed points f1 and f2 and one position of adjustable point a1 are set on the boundary B1, and one position of fixed point f3 and one position of adjustable point a3 are set on the boundary B3. Another position of adjustable point a2 is set in the corner of the boundaries B1 and B3. The positions of adjustable points a1 to a3 are set as a group on the boundaries B1 and B3, and in response to an input operation to move the positions of the adjustable points a1 to a3, the positions of the adjustable points a1 to a3 are moved together to the positions of the control points a1' to a3'. The three positions of fixed points f1, f2 and f3 do not move. The positions of the boundaries B1 and B3 on which the positions of the adjustable points a1 to a3 are set are correspondingly adjusted, such that the range of the overlapping area can be adjusted from ROA1 to ROA1". The range of the non-overlapping area can be adjusted from RNOA2 to RNOA2".

Figure 8:
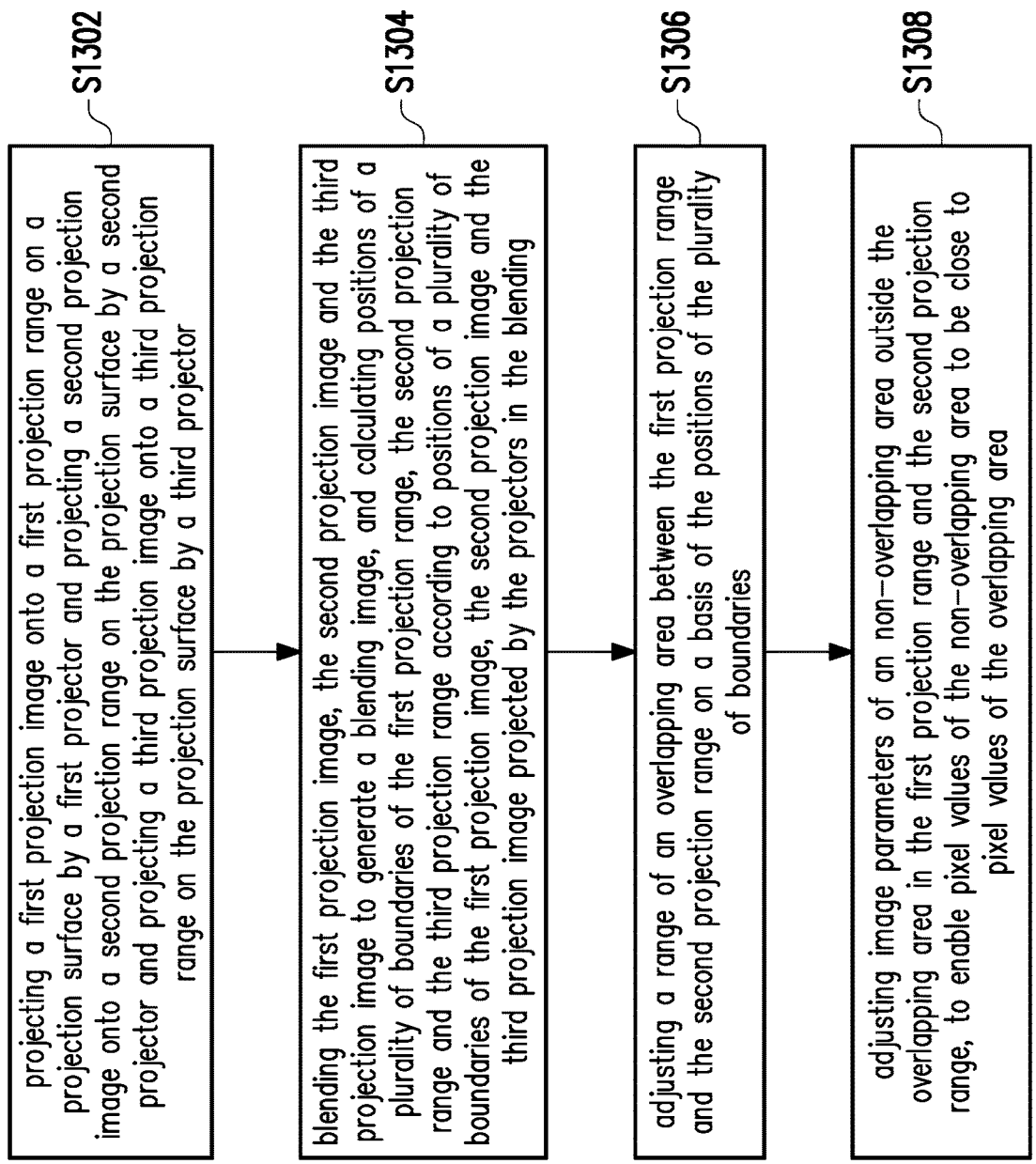
FIG. 8 is a flowchart of a projection blending method according to an embodiment of the disclosure.

FIG. 8 is a flowchart of a projection blending method according to an embodiment of the disclosure. Referring to FIG. 8, the method of the embodiment is adapted to the processing device 50 as shown in FIG. 3.

In step S1302, the main processor 500 controls the first projector to project a first projection image onto a first projection range on a projection surface and control the second projector to project a second projection image onto a second projection range on the projection surface and controls the third projector to project a third projection image onto a third projection range on a projection surface.

In step S1304, the main processor 500 blends the first projection image, the second projection image and the third projection image to generate a blending image, and calculates positions of a plurality of boundaries of the first projection range, the second projection range and the third projection range according to positions of a plurality of boundaries of the first projection image, the second projection image and the third projection image projected by the projectors in the blending.

In step S1306, the main processor 500 adjusts a range of an overlapping area between the first projection range and the second projection range on a basis of the positions of the plurality of boundaries.

In step S1308, the main processor 500 adjusts image parameters (values of grey level) of a non-overlapping area outside the overlapping area in the first projection range and the second projection range, to enable pixel values of the non-overlapping area to be close to pixel values of the overlapping area. Finally, the blending image having even chroma is displayed, especially in a dark scenario of the blending image.

It should be noted that the teaching, suggestions and implementations of the projection blending method and method of the adjusting pixel values of blending image in black-level of the embodiment of the disclosure can be derived sufficiently from the embodiments of FIG. 4A to FIG. 8, and thus related descriptions are omitted herein. In addition, it should be noted that the above steps are described based on a projection system having two or more projectors, but the disclosure provides no limitation to the number of projectors in the projection system, and the projection system to which the projection blending method of the disclosure is applied may have two or more projectors (such as the projection system shown in FIG. 2A).

In addition, in an embodiment, after the main processor 500 of FIG. 3 identifies the range and position of the overlapping area between each of the projection images, the main processor 500 may also record the blending relationship of all the projection images. For example, the positions of all non-overlapping areas and overlapping areas are recorded at one time by using a larger coordinate system (for example, the coordinate relationship of camera and projector), such that the subsequent projection blending and adjusting pixel values operation may be performed based on the image overlapping relationship.

It should be noted that, in the foregoing embodiment, the projection blending and pixel values adjusting may be implemented in a form of software, but the disclosure is not limited thereto. In another embodiment, the projection blending and pixel values adjusting may be implemented in a form of hardware, such as a projection blending circuit/chip and pixel values adjusting circuit/chip having the function of the projection blending and adjusting of pixel values of image.

In summary, the method for adjusting pixel values of blending image, the projection system and the processing device thereof provided by the embodiments of the disclosure may identify a plurality of non-overlapping areas of the plurality of projection images, thus adjusting the image parameters of the projection images in the plurality of non-overlapping areas, such that the pixel values of all of the plurality of projection images are uniform. The overlapping areas obtained may be further used to derive boundaries of the projection ranges of projectors, which are presented along with one or more control points capable of being operated to fine tune the boundaries may be provided on the boundaries so as to facilitate adjustment of pixel values. In this manner, not only that the multiple steps of the adjusting pixel values program in the projection blending operation can be simplified, but also the non-overlapping areas with irregular shapes can be efficiently identified, and the time consumed for the projection blending operation for multiple projection images can be reduced, which in turn increases the overall operation efficiency of the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A method for adjusting pixel values of blending image adapted for a projection system comprising a processing device, an image capturing device and a plurality of projectors, the method comprising:

projecting a first projection image onto a first projection range on a projection surface by a first projector and projecting a second projection image onto a second projection range on the projection surface by a second projector;

blending the first projection image and the second projection image to generate a blending image, and calculating positions of a plurality of boundaries of the first projection range and the second projection range according to positions of a plurality of boundaries of the first projection image and the second projection image;

adjusting a range of an overlapping area between the first projection range and the second projection range on a basis of the positions of the plurality of boundaries of the first projection range and the second projection range; and adjusting image parameters of a non-overlapping area outside the overlapping area in the first projection range and the second projection range, to enable pixel values of the non-overlapping area to be close to pixel values of the overlapping area;

wherein the method further comprising:

projecting a test pattern in the first projection image and the second projection image respectively;

capturing the first projection image and the second projection image by the image capturing device;

deforming the first projection image and the second projection image according to positions and shapes of the test pattern in the first projection image and the second projection image;

calculating positions of boundaries of an blending area formed by the deformed first projection image and the deformed second projection image; and blending the deformed first projection image and the deformed second projection image according to the blending area to generate the blending image.

2. The method according to claim 1, further comprising:
obtaining positions of boundaries of the overlapping area derived from positions of boundaries of the blending area and positions of the boundaries of the second projection range.

3. The method according to claim 2, further comprising:
setting a control point on each of the boundaries of the overlapping area;
adjusting a position of the control point according to an input operation, such that the positions of boundaries of the overlapping area is moved; and
determining the range of the non-overlapping area according to the adjusted position of each of the boundaries of the overlapping area.

4. The method according to claim 2, further comprising:
setting a plurality of control points as a group on the boundaries of the overlapping area;
adjusting a position of one of the control points according to an input operation, such that the positions of boundaries of the overlapping area is moved; and
determining the range of the non-overlapping area according to the adjusted position of each of the boundaries of the overlapping area.

5. A projecting system, comprising:
a first projector;
a second projector;
a processing device, connected to the first projector and the second projector; and
an image capturing device connected to the processing device, configured to capture the first projection image on the first projection range and the second projection image on the second projection range;
wherein the processing device configured to:
control the first projector to project a first projection image onto a first projection range on a projection surface and control the second projector to project a second projection image onto a second projection range on the projection surface;
blend the first projection image and the second projection image to generate a blending image, and calculate positions of a plurality of boundaries of the first projection range and the second projection range according to positions of a plurality of boundaries of the first projection image and the second projection image;
adjust a range of an overlapping area between the first projection range and the second projection range on a basis of the positions of the plurality of boundaries of the first projection range and the second projection range; and
adjust image parameters of a non-overlapping area outside the overlapping area in the first projection range and the second projection range, to enable pixel values of the non-overlapping area to be close to pixel values of the overlapping area.

6. The projecting system according to claim 5, wherein the processing device comprises:
a connection interface, configured to connect the first projector and the second projector;
a storage device, configured to store a program instruction module; and
a main processor, coupled to the connection interface and the storage device, and configured to load and execute the program instruction module in the storage device, wherein the program instruction module comprises an image segmentation management module, a control pattern setting module, and an adjusting pixel values management module.

7. The projecting system according to claim 6, wherein the connection interface is further configured to connect an image capturing device.

* * * * *